United States Patent [19]

Stark et al.

[11] Patent Number: 4,520,794
[45] Date of Patent: Jun. 4, 1985

[54] SOLAR ENERGY CONCENTRATING SLAT ARRANGEMENT AND COLLECTOR

[75] Inventors: Virgil Stark, New York, N.Y.; Pierre Genequand, Geneva, Switzerland

[73] Assignee: North American Utility Construction Corporation, New York, N.Y.

[21] Appl. No.: 354,930

[22] Filed: Mar. 5, 1982

[51] Int. Cl.[3] .............................................. F24J 3/02
[52] U.S. Cl. .................................... 126/438; 126/439; 126/424
[58] Field of Search ............... 126/438, 424, 425, 451, 126/439; 350/288, 292, 293, 289

[56] References Cited

U.S. PATENT DOCUMENTS

| | | | |
|---|---|---|---|
| 1,240,890 | 9/1917 | Shuman et al. | 126/438 X |
| 1,367,472 | 2/1921 | Harvey | 126/438 |
| 1,951,404 | 3/1934 | Goddard | 126/438 |
| 2,945,417 | 7/1960 | Caryl et al. | 126/451 X |
| 3,938,497 | 2/1976 | Andrassy | 126/451 |
| 4,071,017 | 1/1978 | Russell, Jr. et al. | 126/438 X |
| 4,136,671 | 1/1979 | Whiteford | 126/438 |
| 4,148,564 | 4/1979 | Denin et al. | 126/424 X |
| 4,249,514 | 2/1981 | Jones | 126/438 |

Primary Examiner—Larry Jones
Attorney, Agent, or Firm—Kenyon & Kenyon

[57] ABSTRACT

Disclosed are improved elongated, reflective slat concentrators and elongated multi-conduit/multi-fluid collectors and systems thereof. The reflective slats are generally of rectangular configuration and extending about a curve. In systems utilizing the concentrators, the collector is located above the concentrator, i.e. forwardly of the concentrator relative to the travel of solar energy to the concentrator.

14 Claims, 7 Drawing Figures

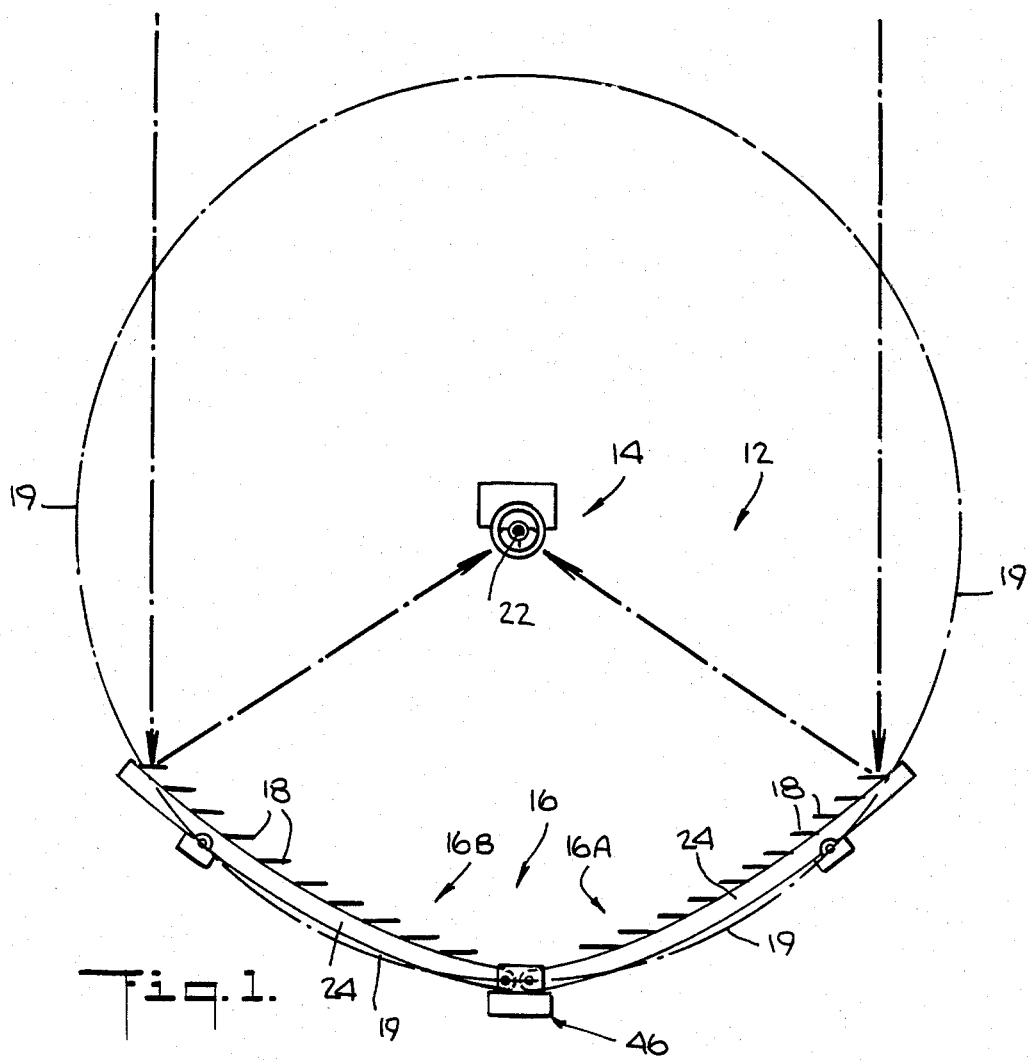
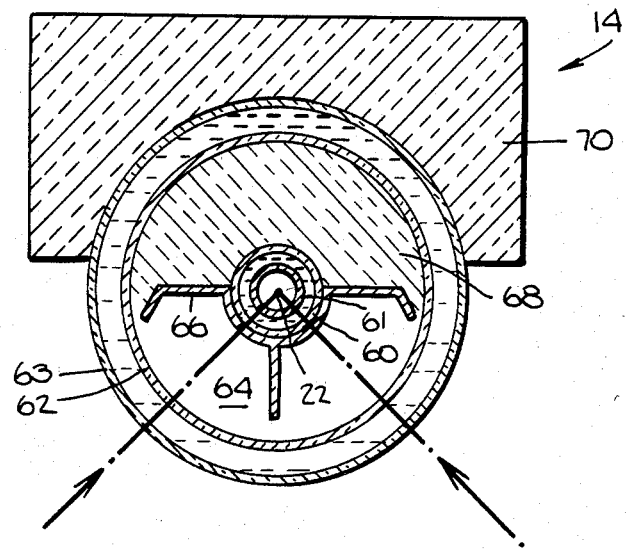

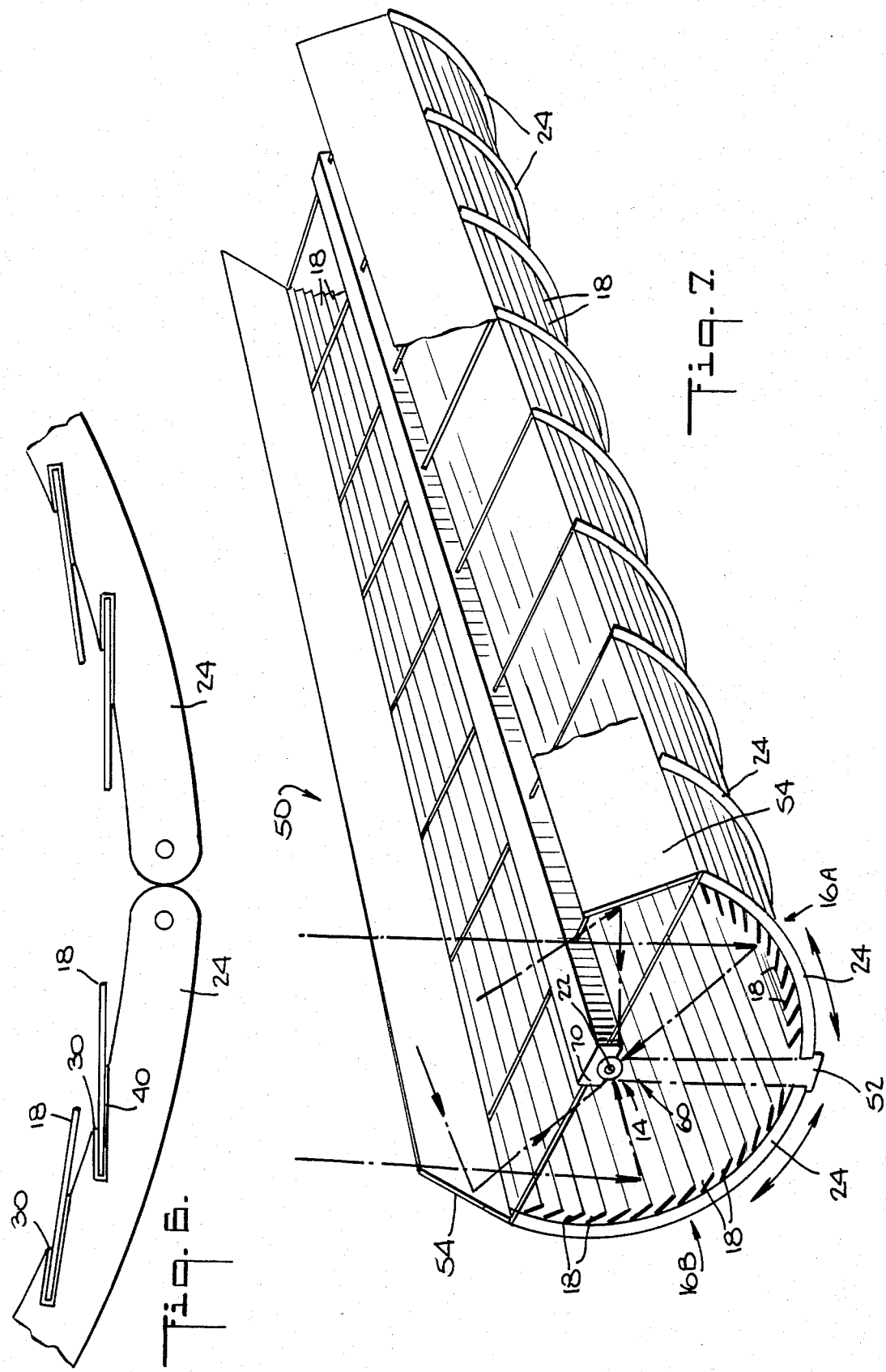

SOLAR ENERGY CONCENTRATING SLAT ARRANGEMENT AND COLLECTOR

BACKGROUND OF THE INVENTION

The present invention relates to improved solar energy concentrators, improved solar energy collectors, and to systems utilizing an improved concentrator and/or collector.

In U.S. Pat. No. 4,238,246 to Genequand and Stark, the disclosure of which is incorporated herein by reference, a solar energy system is disclosed which includes a composite concentrator comprising a central Fresnel lens and slide assemblies of reflective slats disposed adjacent the two longitudianl edges of the Fresnel lens, and a collector disposed below the composite concentrator. British Patent Publication No. 2,054,827 discloses that the two slide assemblies can be disposed at an angle to the central Fresnel lens and can include slats of different widths.

U.S. patent application Ser. No. 90,575, filed on Nov. 2, 1979 in the name of Virgil Stark, the disclosure of which is incorporated herein by reference, discloses a solar energy system which includes at least one concentrator consisting of reflective slats disposed to direct a concentrated target of solar energy at a collector disposed below the concentrator.

Various solar energy systems have been developed and of particular interest are the systems disclosed in U.S. Pat. Nos. 4,134,393, 4,191,594, 4,210,121, 4,194,949, 4,249,516, 4,289,118 and in U.S. application Ser. Nos. 807,513, filed June 20, 1977, 44,901, filed June 4, 1979, and 279,203 filed June 30, 1981, the disclosures of all of which are incorporated herein by reference.

While the systems described in the above U.S. patents, British patent publication and U.S. patent applications provide for an efficient conversion of solar energy into useful heat or electrical energy, additional improvements can be made.

In addition, U.S. Pat. No. 2,791,214 to Poliansky and British Patent Specification No. 751,050 of Gardner disclose reflective concentrating structures. The U.S. Pat. No. 2,791,214 to Poliansky discloses a rather complex reflector structure formed of reflector rings of curved geometry. The 751,050 British Patent Specification discloses a reflector structure comprising a large number of rather small reflectors to concentrate solar energy in a focal point above the reflectors.

OBJECTS AND SUMMARY OF THE INVENTION

Accordingly, it is an object of the present invention to provide an apparatus for collecting solar energy which is of increased efficiency and of high concentration.

It is another object of the present invention to provide a solar energy of increased concentration without increasing the overall size of the concentrator.

It is another object of the present invention to provide an apparatus for collecting solar energy which is of relatively simple and sturdy construction.

It is another object of the present invention to provide a solar energy concentrator which avoids the absorption of most of the ultraviolet rays.

It is another object of the present invention to increase the efficiency of solar collectors.

The above and other objects of the invention are achieved by providing improved collectors, improved concentrators and improved systems using an improved collector, an improved concentrator or both.

Briefly, the improved concentrators consist, so far as optical elements are concerned, of elongated reflective slats adapted to be disposed below the collector, i.e. in systems utilizing the slat concentrators, the collector is located fowardly of the concentrator relative to the travel of solar energy to the concentrator.

The concentrators according to the invention exclude refringent elements and thereby absorb little or no luminous and ultraviolet solar energy, which is important where the solar energy is being converted to electricity.

A concentrator according to the invention and the slats of which the concentrator is comprised are elongated and are so disposed as to reflect and direct solar energy impinging thereon into a concentrated, elongated target located forwardly of the concentrator relative to the travel of solar energy to the concentrator. The collector is elongated and is disposed to receive the elongated concentrated target.

The slat concentrators according to the invention, which are disposed rearwardly of, or below, the collector provide concentration comparable to a slat concentrator disposed forwardly of, or above, the collector but with substantially less slat surface area. This reduces the overall cost of the concentrator while not reducing the concentrating power of the concentrator.

The slats can be of relatively simple construction and are preferably of generally rectangular configuration. The slats can be made entirely of suitable material having a highly reflective surface or they can be made of a base material on which is disposed a reflective surface coating or layer, or they may be made of silvered glass. For example, the slats can be made of highly reflective, extra-brilliant aluminum and can be covered with a protective coating which resists weathering and corrosion. Such a coating could be an anodized coating or a coating applied by a spraying process, or a transparent plastic or chemical film or coating.

The slats can be supported by relatively simple structures and disposed to lie along or adjacent to a curve, for example a circle or a parabola or a composite curve. The slats can be disposed with their longitudinal axes extending through a line which coincides with the curve, is adjacent to the curve or intersects the curve. The line may be curved or straight. The slats of each concentrator or cooperating concentrators can be disposed at the same or different angles to tangents of the curve or the line. The slats may be of the same size or different sizes.

The concentrators may be provided as individual concentrators or as composites of two or more concentrators.

A system may be provided with only one concentrator having slats disposed on both sides of the collector or of two or more concentrators with at least part of one concentrator disposed on each side of the collector.

In one embodiment, a system is provided with two concentrators with the collector centrally disposed relative to the two concentrators. The slats of the two concentrators are disposed about a circle at the center of which is disposed the collector. The axes of the slats extend through one or more curves or straight lines which can coincide with or intersect segments of the circle or which can extend adjacent to segments of the circle. The two concentrators can be disposed adjacent to each other or spaced apart with a reflective surface disposed between the two spaced concentrators.

Reflective surfaces can be disposed at the exterior sides of a single concentrator or at the exterior sides of a composite concentrator.

The concentrators may be mounted to be individually adjustable or adjustable as a composite independently of the collector. The concentrators and the collector can also be interconnected and pivotable as a unit in which the individual or composite concentrators may further be adjustable independently of the collector.

The collector comprises a number of conduits, one disposed in the other with spaces between adjacent conduits. At least two fluids are passed through the collector to remove the heat converted from the solar energy received by the collector. Photovoltoic cells may be disposed in the collector to convert solar energy to electricity.

In two embodiments, three conduits are provided, and in one embodiment four conduits are provided. In one three conduit arrangement, a first conduit through which a fluid can be passed is disposed in a second conduit with a space therebetween for passing a fluid therethrough. Both conduits are preferably metal and the second or outer of the two conduits is preferably blackened. A plate or sheet is disposed in a heat exchange relationship with the second conduit in the space between the two conduits. The sheet is preferably metallic and is preferably soldered to the metallic second conduit.

The sheet can be extended at an angle at its extreme ends and can also include a projecting surface between the extreme ends all of which face the concentrator to increase the absorbing surface area of the sheet.

A third conduit encloses the sheet and the first and second conduits and is spaced from the second conduit. The third conduit is transparent at least in part to allow concentrated solar energy to reach the sheet. The space between the second and third conduits is closed off and insulation is disposed between the second and third conduits on the side of the sheet facing away from the concentrator.

In the four conduit arrangement, a fourth conduit, transparent at least in part, encloses the third conduit with a space between the two conduits for passing a transparent fluid therebetween.

In another three conduit arrangement, the first and second conduits are replaced by a single conduit with the sheet disposed in a heat exchange relationship with the single conduit.

The three or four conduit arrangement can be disposed in an insulated container with the transparent parts of the outer conduits exposed to the concentrator so that the sheet can receive the concentrated solar energy.

The photovoltaic cells can be disposed in the interior of the third conduit replacing the sheet and the first two conduits.

A fluid with a boiling point of about 300° or higher can be circulated in the conduit attached to the sheet and the fluids can be made to pass through the collector in a turbulent fashion.

With the concentrating system disposed north-south, means can be provided for tracking the system hourly in an east-west direction and further means can be provided for adjusting the system in a north-south direction on a seasonal basis. Alternatively, the system can be disposed in an east-west direction without means for tracking on an hourly basis. Means for adjusting can be provided for the latter system in a north-south direction on a seasonal basis.

The many advantages of utilizing multi-conduit/multifluid collectors are described below and in the incorporated by reference documents.

The above and other objects, aspects, features and advantages of the present invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is a side, schematic view of solar energy concentrating and collecting apparatus according to the invention, depicting an elongated, concentrating slat arrangement according to the invention and an elongated, multi-conduit collector according to the invention;

FIG. 2 is an enlarged, transverse cross-sectional view of the elongated collector FIG. 1;

FIGS. 5 and 6 are side schematic views of portions of different embodiments according to the invention of the elongated concentrating slat arrangement of FIG. 1; and FIG. 7 is a perspective view of another embodiment of a solar energy concentrating and collector apparatus according to the invention which includes further reflective surfaces.

DESCRIPTION OF THE PREFERRED EMBODIMENTS

Figure 3:
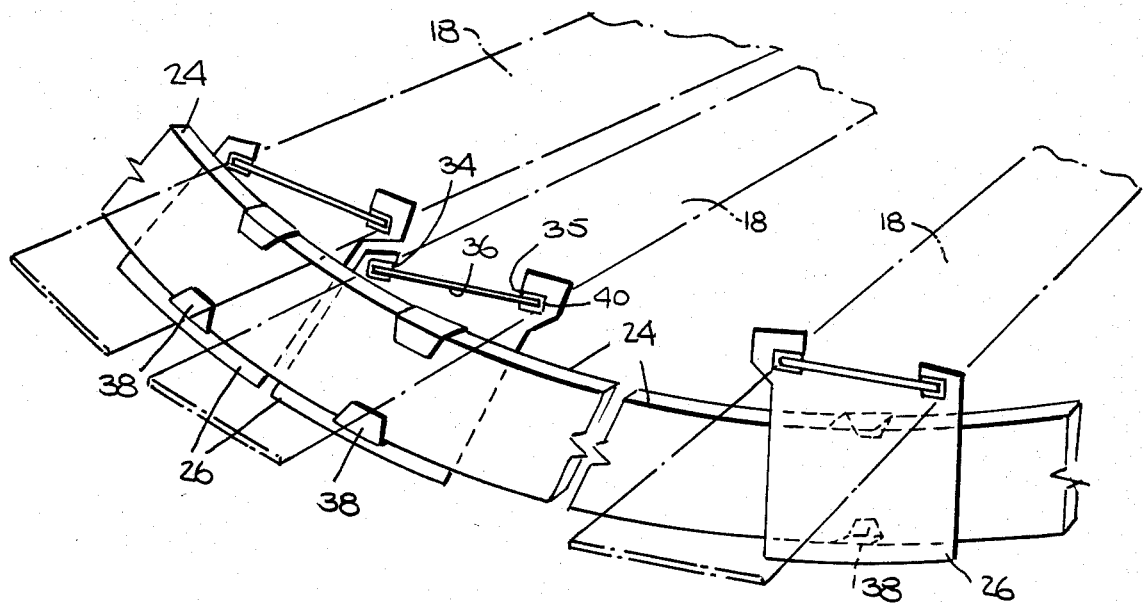
FIG. 3 is a perspective view of portions of the elongated concentrating slat arrangement of FIG. 1.

The embodiments of solar energy systems selected for the purpose illustrating the invention include a collector and a concentrator. A system can include a single concentrator or individual concentrators disposed to form a composite concentrator as depicted in FIG. 1. While the illustrated systems include both improved concentrators and improved collectors, it is within the contemplation of the invention to utilize an improved concentrator with a conventional collector and an improved collector with a conventional concentrator. The invention therefore is directed to improved concentrators, improved collectors and improved solar energy systems which include an improved concentrator or an improved collector or both.

Referring now to FIG. 1, a solar energy system 12 is depicted which comprises a collector 14 and two individual concentrators 16A, 16B, disposed to form a composite concentrator 16. The concentrator and the collector in FIG. 1 are elongated and have generally parallel axes. Each concentrator, so far as optical elements are concerned, consists of individual reflective slats 18. Each of the slats 18 has a longitudinal axis which extends parallel to the longitudinal axis of the collector 14. The slats 18 are disposed about circle 19 with their individual axes extending through one or more curved lines which are adjacent to and intersect the circle 19. The curved line or lines may be circular or parabolic, or a composite or combination of curves. Also, the longitudinal axes of the slats can, if desired, extend through straight lines which are adjacent to or intersect segments of the circle 19. The collector 14 is disposed extending through the center of the circle 19.

The concentrators 16A, 16B exclude refringent optical elements and accordingly avoid to a great extent the absorption of ultraviolet energy. The individual slats 18 and the concentrators are so disposed as to reflect and direct solar energy impinging thereon into a concentrated target 22 located forwardly of the concentrators relative to the travel of solar energy to the respective concentrator and generally at the center of circle 19. The collector 14 is disposed at the center of the circle 19 along the elongated concentrated target 22.

The individual slats 18 may be of generally rectangular configuration and may be made of extra-brilliant aluminum or silvered, preferably water-white glass. Other materials such as polished, reflective metals such as aluminum or steel can also be used. The slats may also be made of plastic or other material covered by a reflective coating or layer such as, for example, aluminum foil. Thus, it is contemplated that the slats be made entirely of a material which is highly reflective or of a material having a coating or layer of another material which is highly reflective. Where the surfaces of the slats are subject to weathering, means can be provided such as an anti-corrosive protective coating to protect them. Aluminum slats can be covered by an anodized coating or a coating applied by a spraying process.

Figure 4:
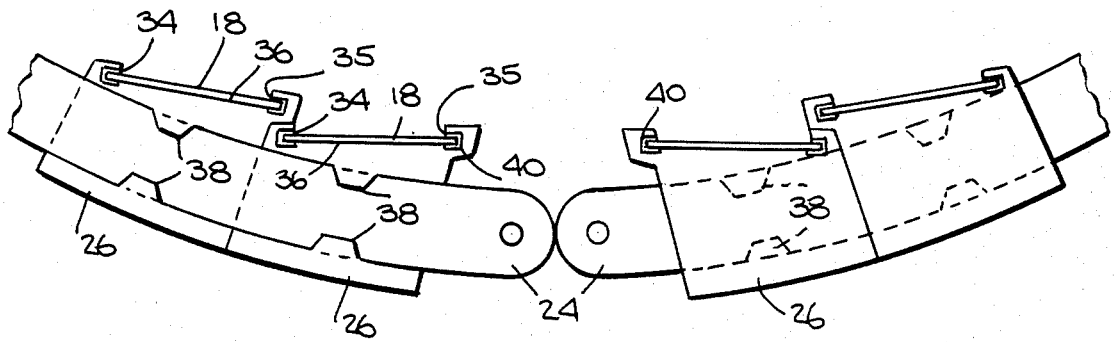
FIG. 4 is a side schematic view of portions of the elongated concentrating slat arrangement of FIG. 1.
Figure 5:
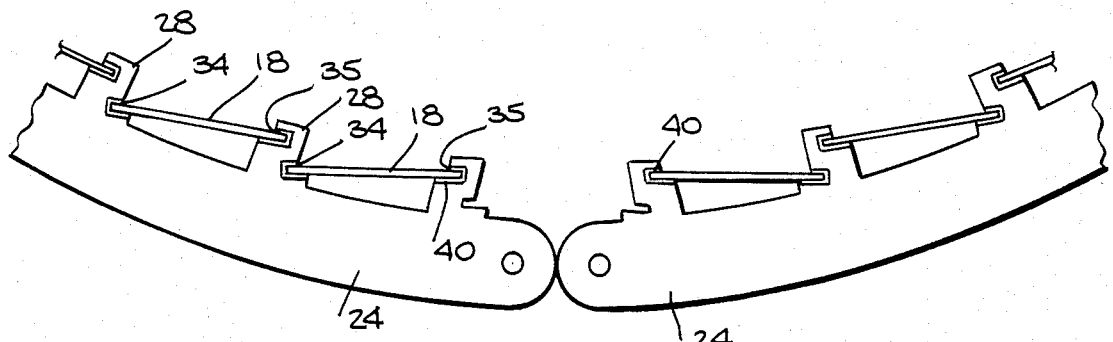

The slats may be mounted or secured to a frame in any suitable manner. For example, a frame may be provided which comprises bands 24 of metal, plastic, wood or other material extending transversely of the slat longitudinal axes and spaced apart by suitable distances along the longitudinal axes of the slats or only at the slat ends to support the slats. Suitable frame members (not shown) may interconnect the bands. Since the slats and the bands are separated, there are spaces for rain water to drain and which also improve the wind resistance of the concentrator. The slats may be secured to the bands 24 by individual brackets 26 as illustrated in FIGS. 3 and 4, by projections 28 forming part of or secured to the bands 24 as shown in FIG. 5, and by slots 30 in the bands 24 as shown in FIG. 6. While bands have been illustrated in which the bands are curved to provide the curved line through which the slat axes extend, a planar band may also be utilized and may be divided into two or more adjacent band segments disposed at an angle to each other in which the band segments approximate a curved line.

The brackets 26 each include opposed longitudinally extending slats 34, 35 and a slat-receiving part 36 between the slats. The individual brackets 26 shown in FIGS. 3 and 4 include lanced tabs 38 through which the band 24 passes to secure a bracket to the band. In order to enable the use of identical brackets 26, the brackets are secured to the left-hand and right-hand bands 24 of FIGS. 3 and 4 in opposite directions.

The embodiment of FIG. 5 is similar to that of FIGS. 3 and 4 except that the slots 34, 35 are formed in opposite sides of projections 28 which form part of or are secured to band 24. Also the embodiment of FIG. 5 does not include the central slat-receiving part 36.

In FIG. 6, slots 30 are made directly into the surface of the band 24.

In order to facilitate mounting of individual slats in the slots directly in the band 24 or the slots in the bracket 26 or projections 28, the slots are made larger than the thickness of the individual slats and suitable means such as rubber spacers 40 are provided to secure each slat in place. To this end, each spacer can be secured to a slat to fit within a slot with sufficient bias to hold the slat firmly in place.

Depending on the location of the system and the relative location of the concentrators and the collector, the individual slats 18 of each concentrator may be disposed at the same angle to tangents to the curved line through which their axes extend or series of slats may be disposed at different angles to tangents to the curved line. The slats may also be arranged to be disposed at the same angle or different angles to tangents to the the circle 19.

The widths of individual slats may be the same or may vary in accordance with the location of the particular slat.

The slats may be, for example, 5 cm.–10 cm. wide and 2.5 m.–3 m. long, or pairs of 1.25 m.–1.5 m. long slats may be disposed in longitudinal alignment. The overall length of the concentrator can be extended by placing further slats in longitudinal alignment. When fabricating the slats of silvered glass, they may be made for example 1 mm. thick, 5 cm.–10 cm. wide and 1.25 m.–1.5 m. long.

Each concentrator in FIG. 1 can include approximately 20 slats for a total of 40 slats.

The slats can be tilted at different angles to the tangents, as mentioned above. All the slats can be, for example, tilted at an angle of about 15° with respect to the respective tangents.

A concentrator can also be provided with series of slats. The slats of each series are at the same angle to the tangents but the slats of one series are at a different angle to the tangents than the slats of another series so that different series of slats are primarily responsible for concentrating the solar energy during different hours of the day or for different seasons. For example, a single concentrator or two adjacent concentrators for a non-tracking, EW system, can have a total of 42 slats disposed with their axes extending through a circle, 14 disposed in the central part of the concentrator(s) at an angle of, for example, 15° to the tangents to reflect the solar rays around noon of each day into the focal target of the collector. Fourteen slats can be disposed to the right of the central slats at an angle of, for example, 25° to the tangents and 14 slats can be disposed to the left of the central slats at an angle of for example, 8° to the tangents. This arrangement would concentrate more solar energy as the incidence of the solar rays varies from being off the normal (to the system) before noon, to the normal at noon, to off the normal again after noon, as compared to a concentrator in which all the slats are disposed at the same angle to the tangents. Further concentration can be obtained for a stationary EW system which is adjusted NS seasonally.

Further, some slats may be arranged to reflect solar rays to the target corresponding to horizon angles of the sun.

The slats described above can be disposed about a circle 19 having a radius of one meter with the collector extending through the center of the circle.

As indicated above, one individual concentrator or a composite concentrator of two concentrators can be utilized. Additionally, three or more concentrators can be utilized.

The collector 14 and the individual concentrators 16A, 16B, can be supported independently as in FIG. 1 or, alternatively, the collector 14 and the concentrator(s) can be supported as an interconnected unit, as in FIG. 7. Each of the concentrators 16A, 16B includes pivot structure as at 46, for indpendently pivoting each concentrator and can include drive means (not shown) for effecting pivoting of the individual concentrators.

The individual concentrators may be adjacently disposed as shown in FIG. 1, or may be spaced apart as shown in FIG. 7. When spaced apart in the system 50 in FIG. 7, with the collector 14 centrally located with respect to the two concentrators 16A, 16B, a reflective surface 52, planar or curved, may be disposed between the two concentrators directly below the collector. Additionally, further reflective surfaces 54 may be disposed adjacent to the exterior sides of the two concentrators of FIGS. 1 and 7. Means can be provided for changing the angle of the reflective surfaces.

The systems described above can be oriented with the axis of the system in the NS direction and can be provided with east-west tracking at approximately 15° an hour, or can be disposed in an EW direction and made adjustable on a seasonal basis. The latter arrangement will collect less total energy during the day depending on the region and season. However, the cost of additional surface area required to offset the loss from not tracking the sun will be about compensated by the omission of the tracking equipment. In an EW system, the EW angle of incidence will not substantially affect the collectible solar energy except at the extreme longitudinal ends of the concentrated target. To partially compensate for this, the NS angle of incidence, as mentioned above, can be adjusted.

Referring now to FIG. 2, the collector 14 includes four tubular conduits 60–63 disposed in a concentric arrangement. In the space 64 between the conduits 61 and 62 is a sheet 66 having angled edges and preferably a central projecting surface disposed in a heat-exchange relationshp with conduit 61. The space 64 is closed off and filled with a transparent gas such as air. Also disposed in space 64 on the side of sheet 66 facing away from the concentrator is insulating material 68. Conduit 61 and sheet 66 are of metal, preferably aluminum, and have their surfaces facing the concentrator blackened with chrome black for example, to increase absorption of solar energy. The sheet and conduit 61 can be soldered together. Conduits 62 and 63 are transparent or at least that part of each conduit which faces the concentrator is transparent. Preferably conduits 62 and 63 are made of glass. The collector 14 also includes an insulated container 70 in which the conduits are disposed with the conduits being only partly received in the container and partly exposed and facing the concentrator. Heat exchange fluids are passed through conduits 60 and 61 and a transparent fluid is passed through the space between conduits 62 and 63. The flow of the heat exchange fluids is preferably made turbulent. The fluid in the space between conduits 60 and 61 can have a boiling point of, for example, 300° C. The fluid in conduit 60 can be water. The fluid between conduits 62 and 63 can be, for example, water, glycol or a mixture of the two.

In operation, the concentrated target 22 of the concentrator is directed to the center of conduit 60 or above conduit 60 and concentrated solar energy is received by the part of sheet 66 facing the concentrator and converted to heat which is transferred to the fluid passing through conduits 60 and 61. The fluids in the conduits 60 and 61 can be raised to relatively high temperatures and the fluid in the space between conduits 60 and 61 is preferably a high boiling point fluid, as mentioned above. The fluid passing through conduit 60 is heated by the fluid in the space between conduits 60 and 61. Thus, those two fluids can be heated to relatively different high temperatures and used to great advantge, as described for example in U.S. Pat. No. 4,134,393.

The fluid in the space between conduits 62 and 63 acts as an insulator to prevent loss of heat from within conduit 62. Conduit 63 is in turn disposed in the insulated container 70 which also insulates the collector. Further insulation for the highly heated sheet and conduit 61 is provided by the insulation in the space between conduits 61 and 62.

If desired, photovoltaic cells 72 can be disposed in conduit 62 replacing sheet 66 and conduits 60 and 61 so as to receive the concentrated solar energy. The fluid passed through the space between conduits 62 and 63 can be selected to absorb substantial amounts of incident infrared solar energy and can, for example, be water or water and glycol. Preferably, the insulation 68 is omitted and in an alternative embodiment, a heat exchange fluid can also be conducted in conduit 62.

As an alternative embodiment, three conduits can be used in which a single conduit replaces conduits 60 and 61.

As another alternative embodiment, conduit 63 can be omitted.

Conduit 60 can have an outside diameter of from about 20–30 mm., the sheet can have a width of from about 60–100 mm., conduit 62 can have an inside diameter of about 100 mm. and conduit 63 can have an inside diameter of about 120 mm.

Various combinations of fluid can be utilized to achieve many different purposes as described in U.S. Pat. Nos. 4,134,393 and 4,210,121 and 4,194,949.

The above collector arrangements can yield a global cost efficiency of up to 50%, for example, at temperatures of up to 250° C. However, if the system is operated at lower temperatures of about 150° C. for example, the three conduit arrangements can be used in which the outermost conduit 63 is omitted. This will increase the optical efficiency as losses for transmission of solar energy through conduit 63 and the fluid in the space between conduits 62 and 63 can be omitted.

Where two fluids are provided which can be heated to different temperatures of, for example, 150° C. and 60° C., the system can be favorably combined with a heat pump. The heat produced by the heat pump can be up to four times the input of equivalent electricity and is dependent upon the absolute temperature input $T_1$ and the absolute temperature output $T_2$. The heat obtainable from a heat pump is higher with a higher temperature output. Thus, a heat pump can be assisted by a solar energy system which increases both $T_1$ and $T_2$. $T_2$ can be increased to a higher temperature as required for space heating such as to 75° C. by using a heat exchanger heated by a fluid of a solar energy system such as described herein.

The advantages of the present invention, as well as certain changes and modifications of the disclosed embodiments thereof will be readily apparent to those skilled in the art. It is the applicants' intention to cover by their claims all those changes and modifications which could be made to the embodiments of the invention herein chosen for the purposes of the disclosure without departing from the spirt and scope of the invention.

While the slats have been shown disposed about a circle, with their axes extending through a curve adjacent to and intersecting the circle, the slats may be disposed about a curve other than a circle such as for example a parabola.

What is claimed is:

1. Apparatus for collecting solar energy comprising:
   at least one concentrator comprising a plurality of solar energy reflective slats each being of generally rectangular cross-section having a planar solar energy reflective surface, the slats having longitudinal axes and being generally disposed with their axes extending about a portion of a circle to direct solar energy impinging on the slats into a concentrated elongated target located forwardly of the concentrator relative to the travel of solar energy to the concentrator and within the circumference of the circle, the slats being grouped in a plurality of series, the slats within each of said series being disposed at the same angle to respective tangents of the circles as the other slats in the respective series; and
   a collector including at least one elongated conduit adapted to pass a fluid therethrough and having a longitudinal axis extending generally parallel to the axes of the slats, the collector being disposed within the circumference of the circle in spaced relationship to the concentrator forwardly of the concentrator so as to receive the solar energy of the concentrated target of the concentrator.

2. The apparatus according to claim 1 wherein the slats are arranged to direct solar energy impinging thereon into a concentrated target located at approximately the center of the circle and wherein the collector is disposed at approximately the center of the circle.

3. The apparatus according to claim 1 wherein the slats are of brilliant aluminum and including means for protecting the reflectivity of the surface of the slats.

4. The apparatus according to claim 1 wherein the slats are of silvered glass.

5. The apparatus according to claim 1 wherein three series of slats are provided for each concentrator, the slats of a central first series being disposed at an angle of about 15° to respective tangents to the circle, the slats a second series of slats located to one side of the first series being disposed at an angle of about 25° to respective tangents to the circle, and the slats of a third series of slats located to another side of the first series of slats being disposed at an angle of about 8° to respective tangents to the circle.

6. The apparatus according to claim 1 wherein the slats are indentical.

7. The apparatus according to claim 1, comprising two concentrators.

8. The apparatus according to claim 7 wherein the collector is disposed centrally relative to the two concentrators.

9. The apparatus according to claim 8 wherein the two concentrators are spaced apart and a reflective surface substantially larger than a reflective slat is disposed between the concentrators.

10. The apparatus according to claim 8 or 9 and including further reflective surfaces disposed at exterior sides of said two concentrators.

11. The apparatus according to claim 1 or 7 and comprising means for adjusting the angle of each concentrator relative to the collector.

12. The apparatus according to claim 1 or 7 and comprising means for interconnecting the collector and each concentrator and for pivoting the collector and each concentrator as a unit.

13. Apparatus for collecting solar energy comprising:
    a plurality of concentrators each including a plurality of solar energy reflective slats having generally parallel longitudinal axes disposed to direct solar energy impinging on the slats into a concentrated elongated target located forwardly of the respective concentrator relative to the travel of solar energy to the respective concentrator, said concentrators being disposed laterally adjacent to one another so that the slats of each concentrator are disposed substantially side by side and are lengthwise co-extensive with the slats of adjacent concentrators, the slats of each concentrator being arranged in a plurality of groups disposed about a curved line, all the slats in each one of said groups being disposed at the same orientation angle to respective tangents of said curved line, each group of slats in any given concentrator having the angular positions of the slats defined by a respective orientation angle different from the orientation angles associated with the other groups of slats in said given concentrator; and
    a collector including at least one elongated conduit adapted to pass a fluid therethrough and having a longitudinal axis extending generally parallel to the axes of the slats, the collector being disposed in spaced relationship to the concentrators forwardly of the concentrators so as to receive the solar energy of the concentrated target of the concentrators.

14. Apparatus for collecting solar energy comprising:
    a plurality of concentrators each including a plurality of solar energy reflective slats having generally parallel longitudinal axes disposed to direct solar energy impinging on the slats into a concentrated elongated target located forwardly of the respective concentrator relative to the travel of solar energy to the respective concentrator, said concentrators being disposed laterally adjacent to one another so that the slats of each concentrator are disposed side by side and are substantially lengthwise coextensive with the slats of adjacent concentrators;
    a first reflective surface substantially larger than a reflective slat, said surface being disposed between a pair of said concentrators;
    a pair of second reflective surfaces disposed at exterior sides of said plurality of concentrators; and
    a collector including at least one elongated conduit adapted to pass a fluid therethrough and having a longitudinal axis extending generally parallel to the axes of the slats, the collector being disposed in spaced relationship to the concentrators forwardly of the concentrators so as to receive the solar energy of the concentrated target of the concentrators.

* * * * *